(12) United States Patent
Aoki et al.

(10) Patent No.: US 11,526,055 B2
(45) Date of Patent: Dec. 13, 2022

(54) ELECTRONIC DEVICE

(71) Applicant: Japan Display Inc., Minato-ku (JP)

(72) Inventors: Yoshiro Aoki, Tokyo (JP); Hiroyuki Kimura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/734,302

(22) Filed: May 2, 2022

(65) Prior Publication Data

US 2022/0252947 A1 Aug. 11, 2022

Related U.S. Application Data

(63) Continuation of application No. 17/349,032, filed on Jun. 16, 2021, now Pat. No. 11,347,116, which is a (Continued)

(30) Foreign Application Priority Data

Dec. 17, 2018 (JP) .............................. JP2018-235699

(51) Int. Cl.
*G02F 1/1343* (2006.01)
*F21V 8/00* (2006.01)
(Continued)

(52) U.S. Cl.
CPC ..... *G02F 1/134309* (2013.01); *G02B 6/0055* (2013.01); *G02F 1/1368* (2013.01);
(Continued)

(58) Field of Classification Search
CPC ............ G02F 1/134309; G02F 1/1368; G02F 1/133528; G02F 1/133345;
(Continued)

(56) References Cited

U.S. PATENT DOCUMENTS

| 4,313,663 A | 2/1982 | Stemme et al. |
| 2008/0273159 A1 | 11/2008 | Seok |

(Continued)

FOREIGN PATENT DOCUMENTS

| JP | H01-251012 A | 10/1989 |
| JP | H09-080581 A | 3/1997 |

(Continued)

OTHER PUBLICATIONS

International Search Report dated Feb. 4, 2020 in PCT/JP2019/048122 filed on Dec. 9, 2019 (2 pages).
(Continued)

*Primary Examiner* — Mariam Qureshi
(74) *Attorney, Agent, or Firm* — Maier & Maier, PLLC

(57) ABSTRACT

According to one embodiment, an electronic device includes a first camera, a first polarizer, a second polarizer, and a liquid crystal panel disposed between the first polarizer and the second polarizer. The liquid crystal panel includes a first scanning line, a first signal line intersecting the first scanning line, a first switching element electrically connected to the first scanning line and the first signal line, and a first control electrode electrically connected to the first switching element. The first control electrode overlaps the first camera, and is disposed in an annular first region.

4 Claims, 15 Drawing Sheets

Related U.S. Application Data continuation of application No. PCT/JP2019/048122, filed on Dec. 9, 2019.

(51) Int. Cl.
*G02F 1/1333* (2006.01)
*G02F 1/1335* (2006.01)
*G02F 1/1362* (2006.01)
*G02F 1/1368* (2006.01)

(52) U.S. Cl.
CPC .. *G02F 1/133345* (2013.01); *G02F 1/133512* (2013.01); *G02F 1/133528* (2013.01); *G02F 1/136286* (2013.01)

(58) Field of Classification Search
CPC ......... G02F 1/133512; G02F 1/134372; G02F 1/134363; G02B 6/0055
See application file for complete search history.

(56) References Cited

U.S. PATENT DOCUMENTS

| | | |
|---|---|---|
| 2013/0009094 A1 | 1/2013 | Tamura |
| 2016/0011633 A1* | 1/2016 | Watanabe ............. G02F 1/1333 345/184 |
| 2016/0097948 A1* | 4/2016 | Chin ................. G02F 1/134309 349/123 |
| 2016/0161664 A1 | 6/2016 | Ishida et al. |
| 2017/0053592 A1 | 2/2017 | Shin et al. |
| 2019/0250312 A1* | 8/2019 | Moon .................. H04N 5/2259 |
| 2019/0384121 A1* | 12/2019 | Nishiwaki ......... G02F 1/133528 |

FOREIGN PATENT DOCUMENTS

| | | |
|---|---|---|
| JP | 2014-211573 A | 11/2014 |
| JP | 2017-040908 A | 11/2014 |
| WO | WO 2015/022887 A1 | 2/2015 |

OTHER PUBLICATIONS

Office Action dated Aug. 2, 2022 in corresponding Japanese Application No. 2018-235699; 8 pages.

* cited by examiner

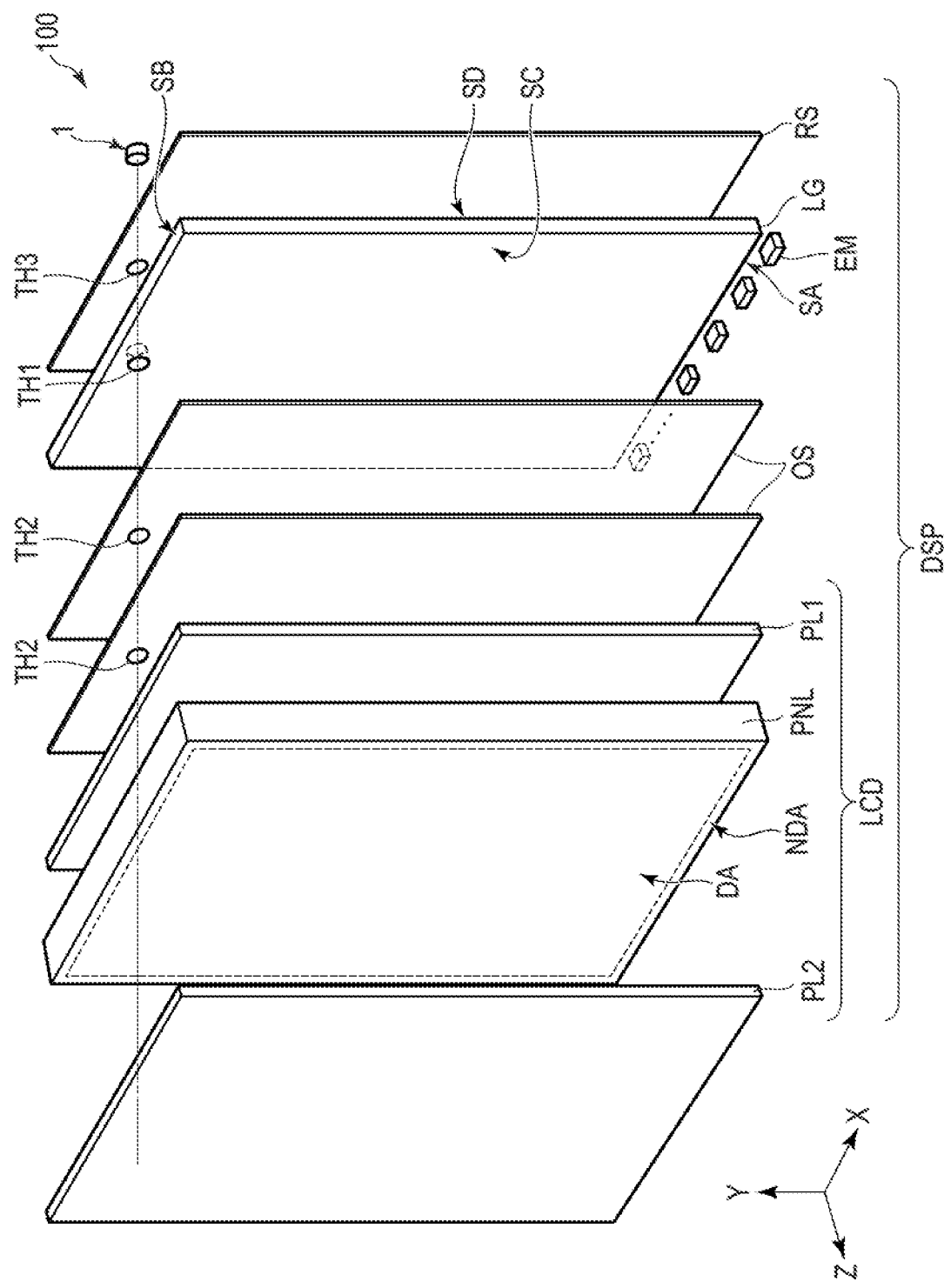
F I G. 1

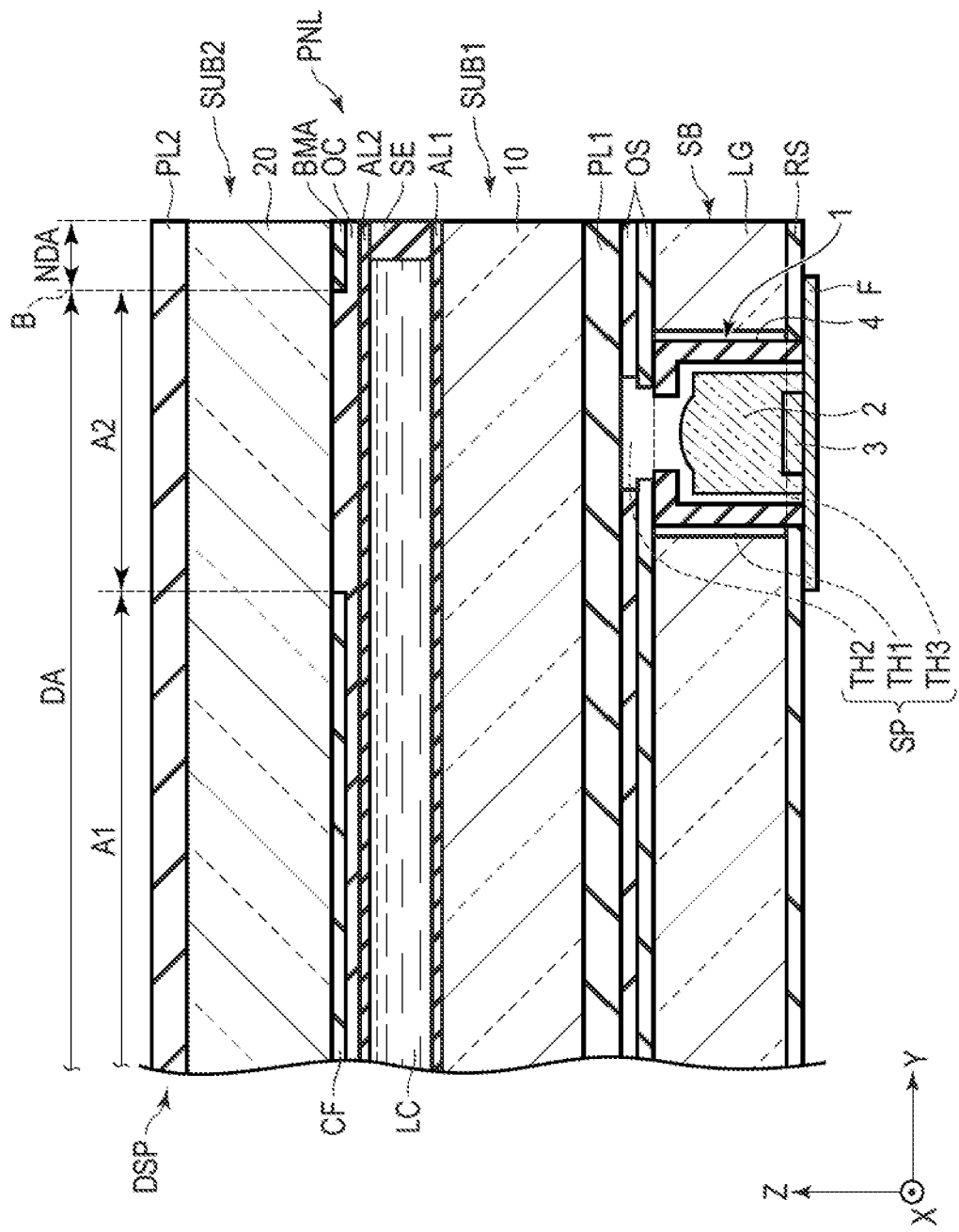
F I G. 2

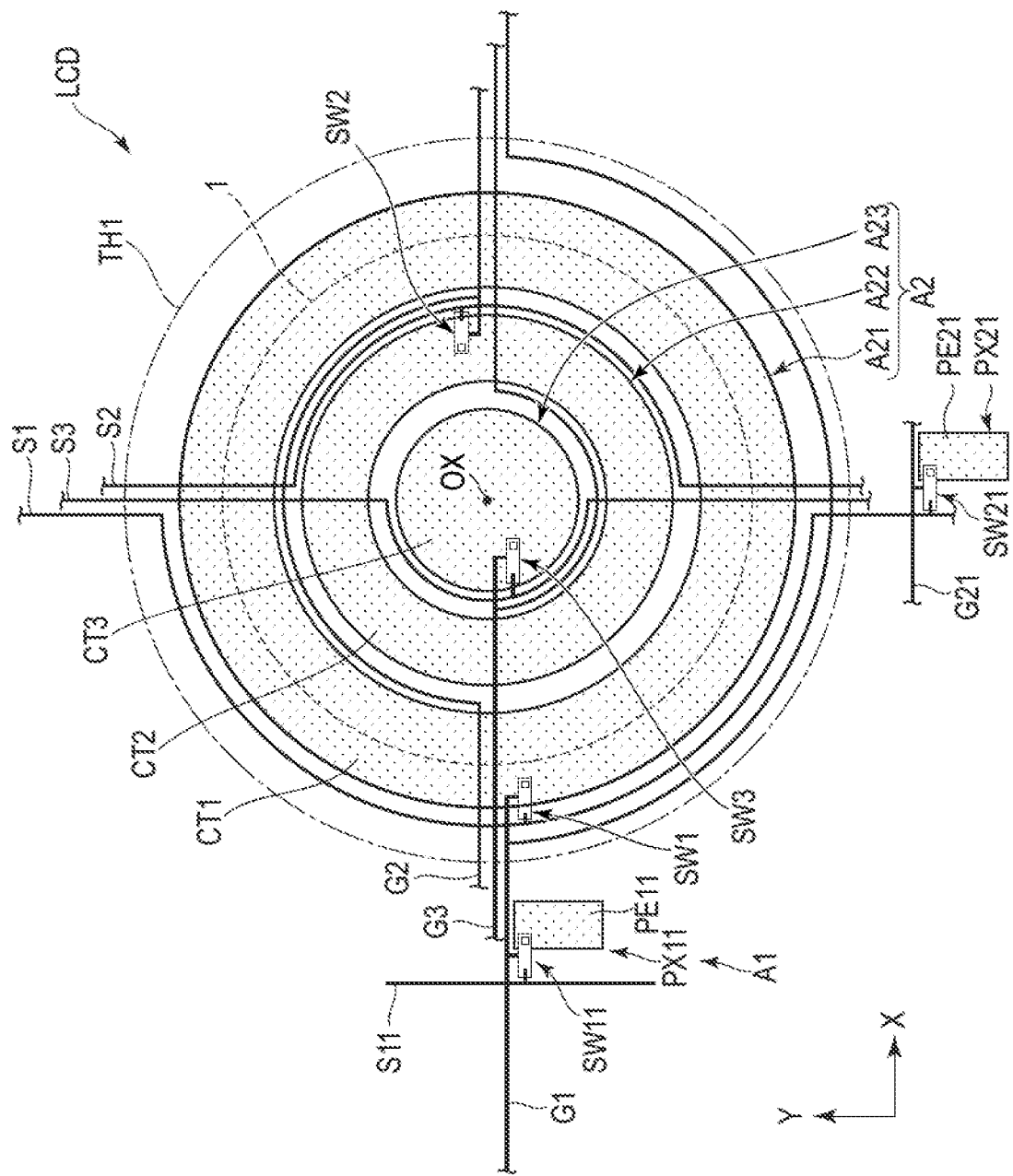
F I G. 5

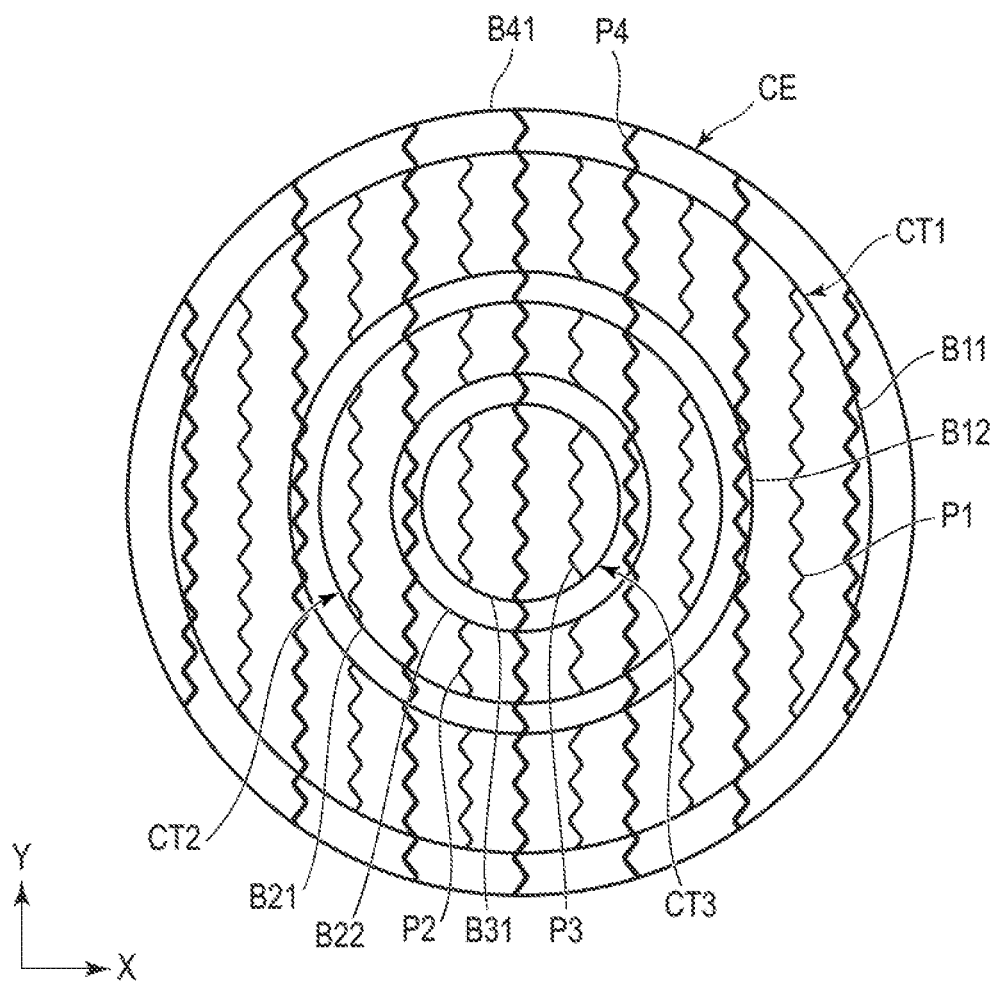
F I G. 10

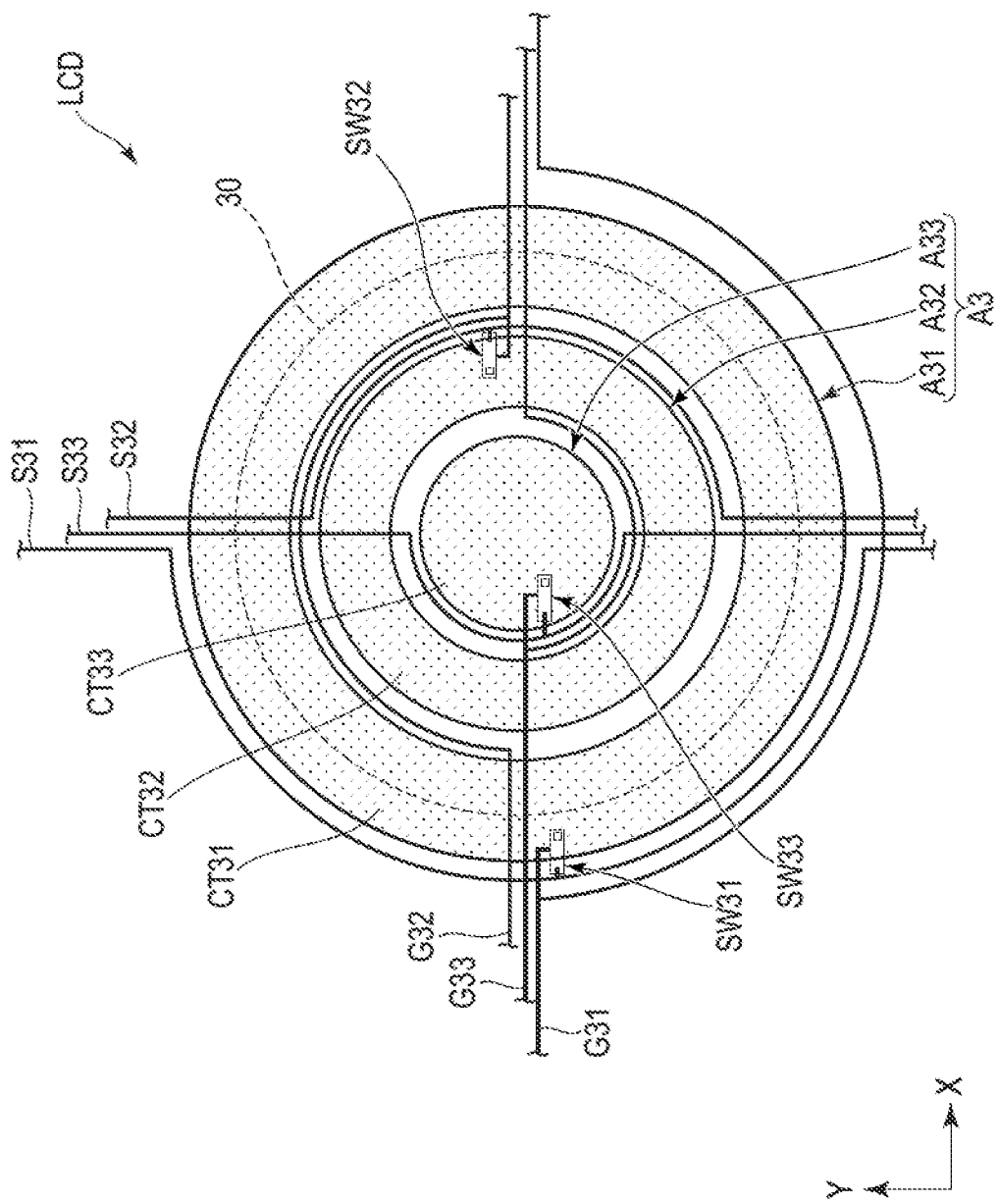
F I G. 15

US 11,526,055 B2

ELECTRONIC DEVICE

CROSS-REFERENCE TO RELATED APPLICATIONS

This application is a continuation of and claims the benefit of priority under 35 U.S.C. § 120 from U.S. application Ser. No. 17/349,032 filed Jun. 16, 2021, which is a continuation application of PCT Application No. PCT/JP2019/048122 filed Dec. 9, 2019, and claims the benefit of priority under 35 U.S.C. § 119 from Japanese Patent Application No. 2018-235699 filed Dec. 17, 2018, the entire contents of each of which are incorporated herein by reference.

FIELD

Embodiments described herein relate generally to an electronic device.

BACKGROUND

Recently, electronic devices such as smartphones comprising a display portion and a camera on the same side have been widely put into practical use. In these electronic device, the camera is disposed outside the display portion, and it is increasingly required to expand the display portion while securing a space for installing the camera. In addition, it is required to be capable of taking a clear picture.

BRIEF DESCRIPTION OF THE DRAWINGS

FIG. 1 is an exploded perspective view showing a configuration example of a display device DSP according to the present embodiment.

FIG. 2 is a cross-sectional view including the display device DSP and a camera 1 shown in FIG. 1.

FIG. 5 is a plan view showing a configuration example of the liquid crystal element LCD overlapping the camera 1.

FIG. 10 is a plan view showing another configuration example of the control electrodes CT1 to CT3 shown in FIG. 5 and a common electrode CE.

FIG. 15 is a plan view showing a configuration example of the liquid crystal element LCD overlapping a camera 30.

DETAILED DESCRIPTION

Figure 3:
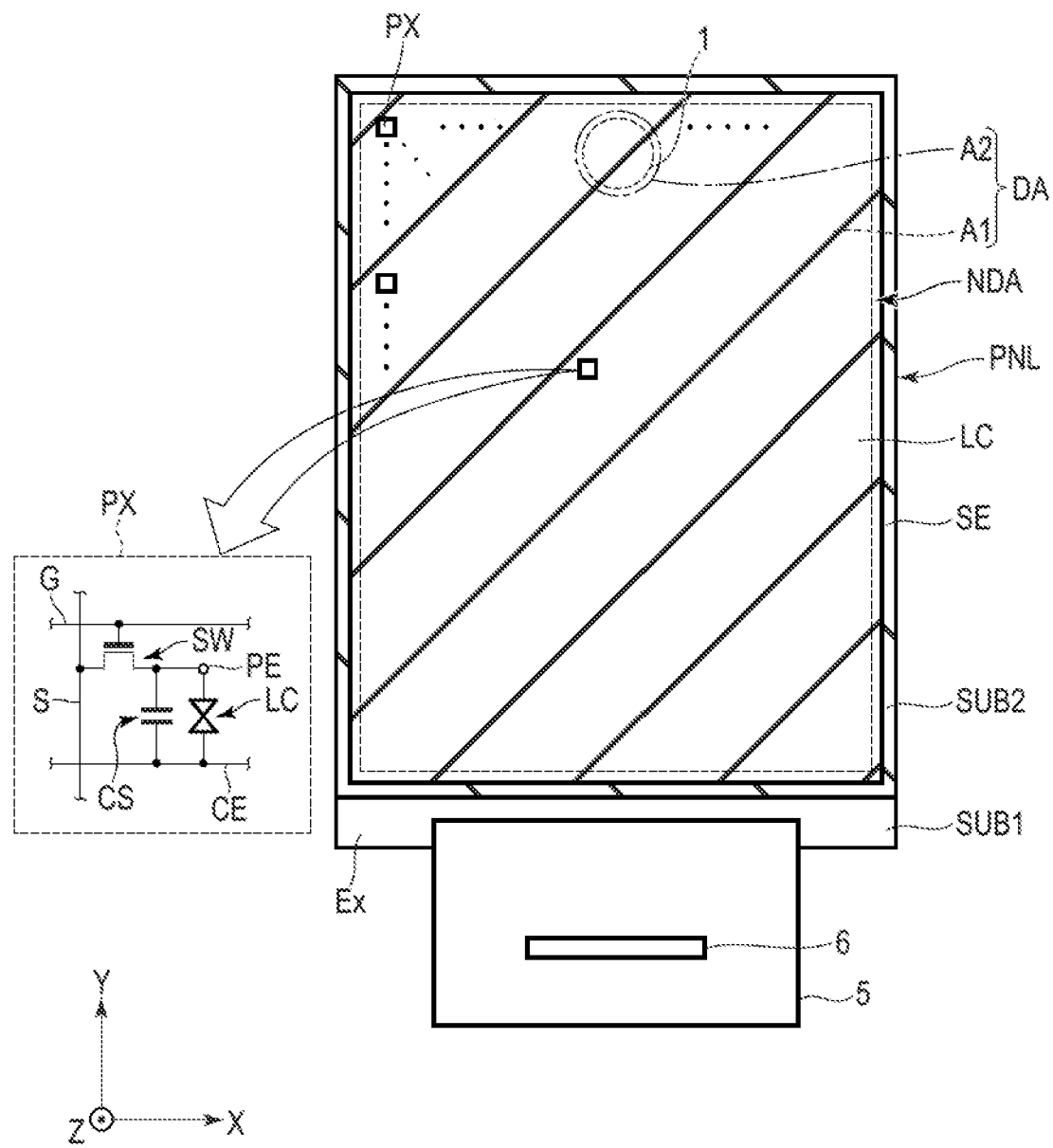
FIG. 3 is a plan view showing a configuration example of a liquid crystal panel PNL shown in FIG. 1.

In general, according to one embodiment, there is provided an electronic device comprising a first camera, a first polarizer, a second polarizer, and a liquid crystal panel disposed between the first polarizer and the second polarizer. The liquid crystal panel comprises a first scanning line, a first signal line intersecting the first scanning line, a first switching element electrically connected to the first scanning line and the first signal line, and a first control electrode electrically connected to the first switching element. The first control electrode overlaps the first camera, and is disposed in an annular first region.

Embodiments will be described hereinafter with reference to the accompanying drawings. The disclosure is merely an example, and proper changes within the spirit of the invention, which are easily conceivable by a skilled person, are included in the scope of the present invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference signs, and detailed descriptions thereof which are considered redundant are omitted unless necessary.

FIG. 1 is an exploded perspective view showing a configuration example of a display device DSP according to the present embodiment. In one example, a first direction X, a second direction Y and a third direction Z are orthogonal to one another. However, they may intersect at an angle other than 90 degrees. The first direction X and the second direction Y correspond to directions parallel to the main surface of a substrate constituting the display device DSP, and the third direction Z corresponds to the thickness direction of the display device DSP.

The display device DSP comprises a first polarizer PL1 and a second polarizer PL2, a liquid crystal panel PNL, optical sheets OS, a light guide LG, light sources EM and a reflective sheet RS. The reflective sheet RS, the light guide LG, the optical sheets OS, the first polarizer PL1, the liquid crystal panel PNL and the second polarizer PL2 are arranged in this order along the third direction Z. The light sources EM are arranged at intervals along the first direction X. The first polarizer PL1, the second polarizer PL2 and the liquid crystal panel PNL constitute a liquid crystal element LCD comprising an optical switch function for light traveling along the third direction Z. This liquid crystal element LCD performs a function of transmitting light or blocking light for each region in an X-Y plane defined by the first direction X and the second direction Y.

An electronic device 100 incorporating this display device DSP comprises a camera 1.

The liquid crystal panel PNL is formed in, for example, a flat plate shape parallel to the X-Y plane. The liquid crystal panel PNL is disposed between the first polarizer PL1 and the second polarizer PL2. The liquid crystal panel PNL comprises a display portion DA for displaying an image, and a frame-shaped non-display portion NDA surrounding the display portion DA. In the present embodiment, the liquid crystal panel PNL overlaps the camera 1 in the third direction Z, and particularly, the display portion DA overlaps the camera 1. Although the description of the detailed configuration of the liquid crystal panel PNL will be omitted here, the liquid crystal panel PNL may comprise a configuration corresponding to any of a display mode using a lateral electric field along the main surface of a substrate, a display mode using a longitudinal electric field along the normal to the main surface of a substrate, a display mode using an inclined electric field inclined in an oblique direction with respect to the main surface of a substrate, and a display mode using an arbitrary combination of the lateral electric field, the longitudinal electric field and the inclined electric field described above. The main surface of the substrate here is a surface parallel to the X-Y plane.

The first polarizer PL1 and the second polarizer PL2 are disposed overlapping at least the display portion DA with respect to the liquid crystal panel PNL. In addition, the first polarizer PL1 and the second polarizer PL2 overlap the camera 1 in the third direction Z.

The light guide LG has a side surface SA opposed to the light sources EM, a side surface SB on the opposite side to the side surface SA, a main surface SC opposed to the liquid crystal panel PNL, a main surface SD on the opposite side to the main surface SC, and a first through hole TH1. The first through hole TH1 is located between the side surface SA and the side surface SB and is closer to the side surface SB than the side surface SA in the second direction Y. The camera 1 overlaps the first through hole TH1 in the third direction Z.

The optical sheets OS are disposed between the light guide LG and the liquid crystal panel PNL, and are opposed to the main surface SC. The optical sheets OS each have a second through hole TH2 overlapping the first through hole TH1. The optical sheets OS each are, for example, a prism sheet or a diffusion sheet.

The reflective sheet RS is opposed to the main surface SD. That is, the light guide LG is disposed between the reflective sheet RS and the optical sheets OS. The reflective sheet RS has a third through hole TH3 overlapping the first through hole TH1. The third through hole TH3, the first through hole TH1 and the second through holes TH2 are arranged in this order along the third direction Z, and are disposed on the same straight line. The reflective sheet RS may be fixed to a frame made of metal, for example. In that case, a through hole overlapping the first through hole TH1 may also be formed in the frame.

The light sources EM each are, for example, a light-emitting diode (LED), and each emit white illumination light. The illumination light emitted from the light sources EM enters from the side surface SA, and travels through the light guide LG. Then, the illumination light guided by the light guide LG is emitted from the main surface SC toward the liquid crystal panel PNL, and illuminates the liquid crystal panel PNL. The liquid crystal panel PNL, the first polarizer PL1 and the second polarizer PL2 selectively transmit the illumination light to display an image in the display portion DA.

FIG. 2 is a cross-sectional view including the display device DSP and the camera 1 shown in FIG. 1. The liquid crystal panel PNL comprises a first substrate SUB1, a second substrate SUB2, a liquid crystal layer LC and a sealant SE. The sealant SE is disposed in the non-display portion NDA, and bonds the first substrate SUB1 and the second substrate SUB2 together and seals in the liquid crystal layer LC.

The main parts of the first substrate SUB1 and the second substrate SUB2 will be briefly described below. The first substrate SUB1 comprises a first insulating substrate 10 and an alignment film AL1. The second substrate SUB2 comprises a second insulating substrate 20, a color filter layer CF, a light-shielding layer BMA, a transparent layer OC and an alignment film AL2.

The first insulating substrate 10 and the second insulating substrate 20 each are a transparent substrate such as a glass substrate or a flexible resin substrate. The alignment films AL1 and AL2 are in contact with the liquid crystal layer LC. The color filter layer CF, the light-shielding layer BMA and the transparent layer OC are disposed between the second insulating substrate 20 and the liquid crystal layer LC. The light-shielding layer BMA is disposed in the non-display portion NDA. A boundary B between the display portion DA and the non-display portion NDA corresponds to the inner edge of the light-shielding layer BMA. The sealant SE is disposed at a position overlapping the light-shielding layer BMA. Although the details of the color filter layer CF are omitted here, for example, the color filter layer CF comprises color filters whose colors are red, green and blue, respectively. The transparent layer OC covers the color filter layer CF and the light-shielding layer BMA. The transparent layer OC is, for example, a transparent organic insulating film.

In the present embodiment, the display portion DA has a region A1 in which the color filter layer CF is disposed, and a region A2 in which the color filter layer CF is not disposed. The transparent layer OC is arranged over the region A1 and the region A2, is in contact with the color filter layer CF in the region A1, and is in contact with the second insulating substrate 20 in the region A2. When attention is focused on the positional relationship between the camera 1 and the display portion DA, the camera 1 overlaps the region A2. That is, the color filter layer CF does not overlap the camera 1.

The first polarizer PL1 is bonded to the first insulating substrate 10. The second polarizer PL2 is bonded to the second insulating substrate 20. The first polarizer PL1 and the second polarizer PL2 are arranged over the region A1 and the second region A2, and overlap the camera 1. It should be noted that the first polarizer PL1 and the second polarizer PL2 may comprise a retarder, a scattering layer, an antireflective layer and the like as needed.

For example, the second polarizer PL2 or the first polarizer PL1 may comprise a super-birefringence film. The super-birefringence film depolarizes (naturalizes) transmitted light when linearly polarized light enters. Therefore, even when a subject includes an object emitting polarized light, it is still possible to shoot without causing a sense of discomfort. For example, when a liquid crystal display device or the like is included in the subject of the camera 1, since linearly polarized light is emitted from the liquid crystal display device, due to the angle of the polarizer of the liquid crystal display device which is the subject with respect to the first polarizer PL1 and the second polarizer PL2, the brightness of the subject (liquid crystal display device) entering the camera 1 changes, and a sense of discomfort may occur during shooting. However, it is possible to suppress a change of brightness which causes a sense of discomfort by providing a super-birefringence film in the second polarizer PL2 or the first polarizer PL1.

As the super-birefringence film, for example, Cosmo Shine (registered trademark) manufactured by Toyobo Co., Ltd. and the like should preferably be used. The super-birefringence here corresponds to in-plane retardation of greater than or equal to 800 nm with respect to light in a visible range, for example, at a wavelength of 550 nm.

The first through hole TH1, the second through hole TH2 and the third through hole TH3 overlap one another, and form a space SP opening below the liquid crystal panel PNL. The camera 1 is disposed in the space SP formed by the first through hole TH1 and the like. The camera 1 comprises, for example, an optical system 2 including at least one lens, an image sensor (imaging element) 3 and a case 4. The case 4 accommodates the optical system 2 and the image sensor 3. The optical system 2 is disposed between the liquid crystal panel PNL and the image sensor 3, and the camera 1 can receive light via the liquid crystal panel PNL. The camera 1 is electrically connected to a wiring board F. It should be noted that the camera 1 does not need to be disposed inside the first through hole TH1 but may be disposed outside the space SP. In either case, the camera 1 only needs to be disposed at a position overlapping the first through hole TH1 in the third direction Z. In the present embodiment, an example where the camera 1 is disposed overlapping the first through hole TH1 is described. However, a light-receiving element which receives light radiated through the first through hole TH1 and the optical system 2 and outputs an electric signal may be disposed overlapping the first through hole TH1.

According to the present embodiment, the camera 1 overlaps the display portion DA of the liquid crystal panel PNL. Therefore, it is not necessary to provide a space for installing the camera 1 in the non-display portion NDA. Consequently, as compared with when the camera 1 overlaps the non-display portion NDA or when the camera 1 does not overlap the display portion DA but the camera 1 and the liquid crystal panel PNL are arranged in the second direction Y, the display portion DA can be expanded, and the width of the non-display portion NDA can be reduced.

In addition, since the camera 1 does not overlap the color filter layer CF, the light entering the camera 1 via the liquid crystal panel PNL is hardly affected by the color filter layer CF. Therefore, undesired absorption and coloring by the color filter layer CF can be suppressed.

In the example shown in FIG. 2, the color filter layer CF is disposed in the second substrate SUB2. However, the color filter layer CF may be disposed in the first substrate SUB1. In addition, from another perspective, the color filter layer CF may be disposed in the region A2.

FIG. 3 is a plan view showing a configuration example of the liquid crystal panel PNL shown in FIG. 1. In FIG. 3, the liquid crystal layer LC and the sealant SE are shown by different diagonal lines. The display portion DA is a substantially quadrangular region which does not include a notch portion, and is located on the inside surrounded by the sealant SE. In planar view, the region A2 is formed in a substantially circular shape shown by a dashed-dotted line, and overlaps the camera 1. In FIG. 3, the outer shape of the camera 1 is shown by a dotted line. The region A2 will be described later in detail.

When the color filter layer CF is disposed in the region A1 but is not disposed in the region A2, the region A1 corresponds to a region capable of color display, and the region A2 corresponds to a region capable of monochrome display. The region A2 is capable of stepwise display from white (or transparent) display to black display, and is also capable of halftone (gray) display. When the color filter layer CF is disposed in the region A2, the region A2 is capable of color display in the same manner as the region A1.

The liquid crystal panel PNL comprises pixels PX arranged in a matrix in the first direction X and the second direction Y in the region A1. The pixels PX do not overlap the camera 1. As shown enlarged in FIG. 3, each pixel PX comprises a switching element SW, a pixel electrode PE, a common electrode CE, a liquid crystal layer LC and the like. The switching element SW is composed of, for example, a thin-film transistor (TFT), and is electrically connected to a scanning line G and a signal line S. The pixel electrode PE is electrically connected to the switching element SW. Each pixel electrode PE is opposed to the common electrode CE. The liquid crystal layer LC is driven by an electric field generated between the pixel electrode PE and the common electrode CE. A capacitance CS is formed, for example, between an electrode having the same potential as the common electrode CE and an electrode having the same potential as the pixel electrode PE.

A wiring board 5 is mounted on an extension portion Ex of the first substrate SUB1. An IC chip 6 is electrically connected to the wiring board 5. It should be noted that the IC chip 6 may be mounted on the extension portion Ex. The IC chip 6 incorporates, for example, a display driver which outputs a signal necessary for displaying an image, and the like. The wiring board 5 is a bendable flexible printed circuit board.

Figure 4:
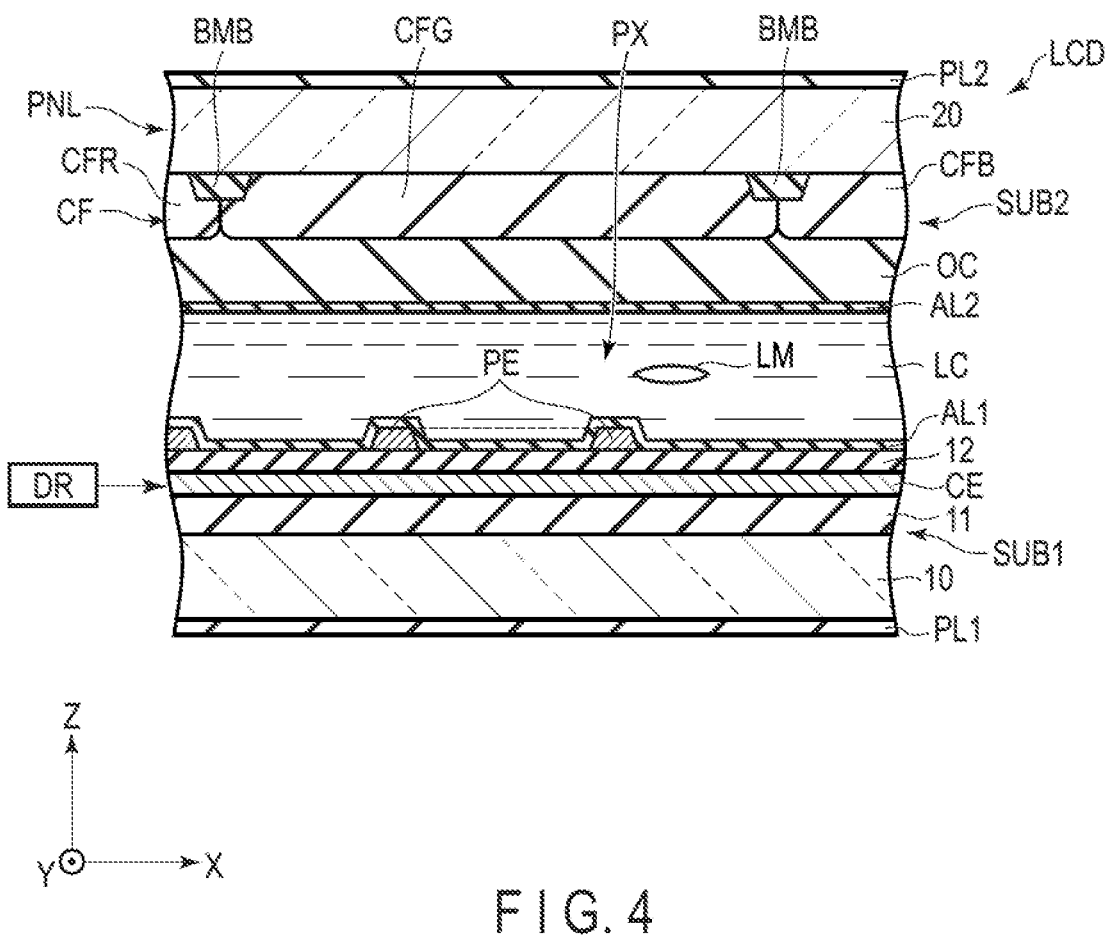
FIG. 4 is a cross-sectional view of a liquid crystal element LCD including a pixel PX shown in FIG. 3.

FIG. 4 is a cross-sectional view of the liquid crystal element LCD including the pixel PX shown in FIG. 3. Here, the liquid crystal element LCD comprising the liquid crystal panel PNL corresponding to the display mode using the lateral electric field will be described. The liquid crystal panel PNL is disposed between the first polarizer PL1 and the second polarizer PL2.

The first substrate SUB1 comprises insulating films 11 and 12, the common electrode CE and the pixel electrode PE between the first insulating substrate 10 and the alignment film AL1. The scanning line, the signal line and the switching element shown in FIG. 3 are disposed, for example, between the first insulating substrate 10 and the common electrode CE. The common electrode CE is disposed on the insulating film 11, and is covered with the insulating film 12. The pixel electrode PE is disposed on the insulating film 12, and is covered with the alignment film AL1. The pixel electrode PE is opposed to the common electrode CE via the insulating film 12. The common electrode CE and the pixel electrode PE are formed of a transparent conductive material such as indium tin oxide (ITO) or indium zinc oxide (IZO). Although not described in detail, the insulating film 11 includes an inorganic insulating film and an organic insulating film. The insulating film 12 is, for example, an inorganic insulating film of silicon nitride or the like.

In the second substrate SUB2, a light-shielding layer BMB is formed integrally with the light-shielding layer BMA in the non-display portion NDA described with reference to FIG. 2. The color filter layer CF includes a red color filter CFR, a green color filter CFG and a blue color filter CFB. The color filter CFG is opposed to the pixel electrode PE. The other color filters CFR and CFB are opposed to the other unillustrated pixel electrodes PE, respectively.

A driver DR which drives the liquid crystal element LCD includes, for example, a scanning line drive circuit electrically connected to the scanning line G and a signal line drive circuit electrically connected to the signal line S shown in FIG. 3. The driver DR outputs a signal necessary for displaying an image and controls the transmittance of the liquid crystal element LCD for each pixel PX. The transmittance of the liquid crystal element LCD is controlled according to the magnitude of voltage applied to the liquid crystal layer LC.

In the pixel PX, for example, in an off state where no voltage is applied to the liquid crystal layer LC, liquid crystal molecules LM contained in the liquid crystal layer LC are initially aligned in a predetermined direction between the alignment films AL1 and AL2. In the off state, light guided from the light source EM shown in FIG. 1 to the pixel PX is absorbed by the first polarizer PL1 and the second polarizer PL2. Therefore, the liquid crystal element LCD displays black in the pixel PX in the off state.

On the other hand, in an on state where voltage is applied to the liquid crystal layer LC, the liquid crystal molecules LM are aligned in a different direction from the initial alignment direction by an electric field formed between the pixel electrode PE and the common electrode CE, and the alignment direction is controlled by the electric field. In the on state, a part of light guided to the pixel PX is transmitted through the first polarizer PL1 and the second polarizer PL2. Therefore, the liquid crystal element LCD displays a color corresponding to the color filter layer CF in the pixel PX in the on state.

The above example corresponds to a so-called normally black mode in which black is displayed in the off state. However, a normally white mode in which black is displayed in the on state (white is displayed in the off state) may be applied.

FIG. 5 is a plan view showing a configuration example of the liquid crystal element LCD overlapping the camera 1. The liquid crystal element LCD has three regions A21 to A23 as the region A2 overlapping the camera 1. The regions A21 and A22 each are formed in an annular shape. The region A23 is formed in an almost circular shape. The region A22 is adjacent to the inner side of the region A21, and the region A23 is adjacent to the inner side of the region A22. The three regions A21 to A23 are formed almost isotropically about an optical axis OX of the camera 1. It should be noted that the region A2 may be divided into four or more regions or may be divided into two regions. In addition, a case where the outer shape is a perfect circular shape is shown as an example of the annular shape. However, the outer shape may be a shape other than a perfect circular shape such as an elliptical shape.

The camera 1 is disposed in the first through hole TH1 of the light guide LG as described with reference to FIG. 2, and all the three regions A21 to A23 overlap the first through hole TH1. The outer shape of the camera 1 is shown by a dotted line, and the first through hole TH1 is shown by a dashed dotted line.

A control electrode CT1 is disposed in the region A21, and is formed in a substantially annular shape. A control electrode CT2 is disposed in the region A22, and is formed in a substantially annular shape. A control electrode CT3 is disposed in the region A23, and is formed in a substantially circular shape.

A scanning line G1 extends along the first direction X in the region A1. A signal line S1 extends along the second direction Y in the region A1. The scanning line G1 and the signal line S1 are formed in an arc shape along the outer edge of the region A21 (or the control electrode CT1), and the arc-shaped parts of the scanning line G1 and the signal line S1 do not overlap the regions A21 to A23.

A switching element SW1 is disposed at the intersection of the scanning line G1 and the signal line S1, and is electrically connected to the scanning line G1 and the signal line S1. The control electrode CT1 is electrically connected to the switching element SW1.

A scanning line G2 extends along the first direction X, and intersects the region A21. A signal line S2 extends along the second direction Y, and intersects the region A21. That is, a part of the scanning line G2 and a part of the signal line S2 overlap the control electrode CT1. In addition, the scanning line G2 and the signal line S2 are formed in an arc shape along the outer edge of the region A22 (or the control electrode CT2), and the arc-shaped parts of the scanning lines G2 and the signal line S2 do not overlap the regions A22 and A23. Furthermore, the scanning line G2 and the signal line S2 are disposed between the regions A21 and A22 (or between the control electrodes CT1 and CT2).

A switching element SW2 is disposed at the intersection of the scanning line G2 and the signal line S2, and is electrically connected to the scanning line G2 and the signal line S2. The control electrode CT2 is electrically connected to the switching element SW2.

A scanning line G3 extends along the first direction X, and intersects the regions A21 and A22. A signal line S3 extends along the second direction Y, and intersects the regions A21 and A22. That is, a part of the scanning line G3 and a part of the signal line S3 overlap the control electrodes CT1 and CT2. In addition, the scanning line G3 and the signal line S3 are formed in an arc shape along the outer edge of the region A23 (or the control electrode CT3), and the arc-shaped parts of the scanning line G3 and the signal line S3 do not overlap the region A23. Furthermore, the scanning line G3 and the signal line S3 are disposed between the regions A22 and A23 (or the control electrodes CT2 and CT3).

A switching element SW3 is disposed at the intersection of the scanning line G3 and the signal line S3, and is electrically connected to the scanning line G3 and the signal line S3. The control electrode CT3 is electrically connected to the switching element SW3.

In the illustrated example, the scanning lines G1 and G3 are formed in a semicircular shape which is convex to the same side (away from the scanning line G2), and the scanning line G2 is formed in a semicircular shape which is convex to the opposite side to the scanning line G3 (away from the scanning line G3). Accordingly, the scanning lines G1 to G3 do not intersect one another in the region A2.

In addition, the signal lines S1 and S3 are formed in a semicircular shape which is convex to the same side (away from the signal line S2), and the signal line S2 is formed in a semicircular shape which is convex to the opposite side to the signal line S3 (away from the signal line S3). Accordingly, the signal lines S1 to S3 do not intersect one another in the region A2.

When attention is focused on the scanning line G1, in a pixel PX11 of the first region A1, the scanning line G1 intersects a signal line S11. The signal line S11 does not intersect the region A2. The switching element SW11 is disposed at the intersection of the scanning line G1 and the signal line S11, and is electrically connected to the scanning line G1 and the signal line S11. A pixel electrode PE11 is electrically connected to the switching element SW11. In each pixel PX of the region A1, the other scanning lines G2 and G3 are also composed in the same manner as the pixel PX11.

When attention is focused on the signal line S1, in a pixel PX21 of the region A1, the signal line S1 intersects a scanning line G21. The scanning line G21 does not intersect the region A2. The switching element SW21 is disposed at the intersection of the scanning line G21 and the signal line S1, and is electrically connected to the scanning line G21 and the signal line S1. The pixel electrode PE21 is electrically connected to the switching element SW21. In each pixel PX of the region A1, the other signal lines S2 and S3 are also composed in the same manner as the pixel PX21.

In the illustrated example, the scanning lines G1, G3 and G2 are arranged in this order along the second direction Y.

However, the arrangement order is not limited to this example. In addition, another scanning line may be interposed between the scanning line G1 and the scanning line G3 or between the scanning line G3 and the scanning line G2.

The signal lines S1, S3 and S2 are arranged in this order along the first direction X. However, the arrangement order is not limited to this example. Furthermore, another signal line may be interposed between the signal line S1 and the signal line S3 or between the signal line S3 and the signal line S2.

Figure 6:
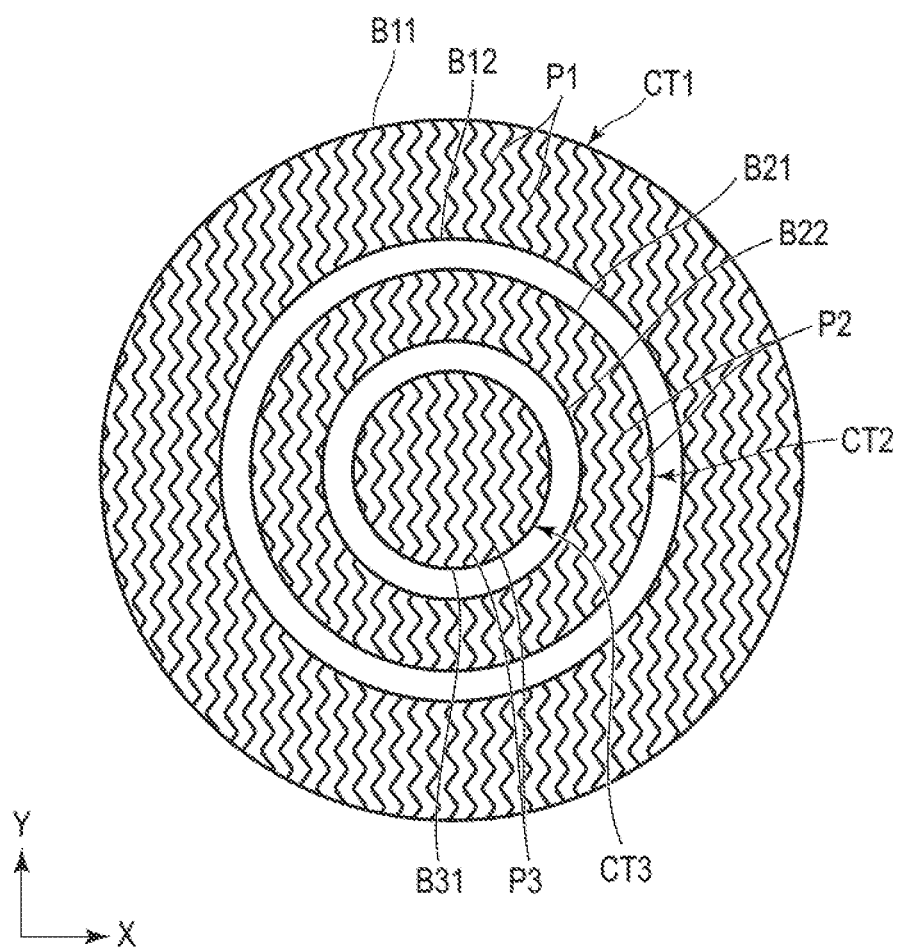
FIG. 6 is a plan view showing a configuration example of control electrodes CT1 to CT3 shown in FIG. 5.

FIG. 6 is a plan view showing a configuration example of the control electrodes CT1 to CT3 shown in FIG. 5.

The control electrode CT1 comprises annular base electrodes B11 and B12 and a plurality of strip electrodes P1. The base electrode B12 is disposed on the inner side of the base electrode B11. The strip electrodes P1 each are disposed between the base electrodes B11 and B12, and each are connected to the base electrodes B11 and B12.

The control electrode CT2 comprises annular base electrodes B21 and B22 and a plurality of strip electrodes P2. The base electrode B22 is disposed on the inner side of the base electrode B21. The strip electrodes P2 each are disposed between the base electrodes B21 and B22, and each are connected to the base electrodes B21 and B22.

The control electrode CT3 comprises an annular base electrode B31 and a plurality of strip electrodes P3. The strip electrodes P3 each are disposed on the inner side of the base electrode B31, and each are connected to the base electrode B31.

In the illustrated example, the strip electrodes P1 and the base electrodes B11 and B12 are integrally formed, the strip electrodes P2 and the base electrodes B21 and B22 are integrally formed, and the strip electrodes P3 and the base electrode B31 are integrally formed.

Figure 7:
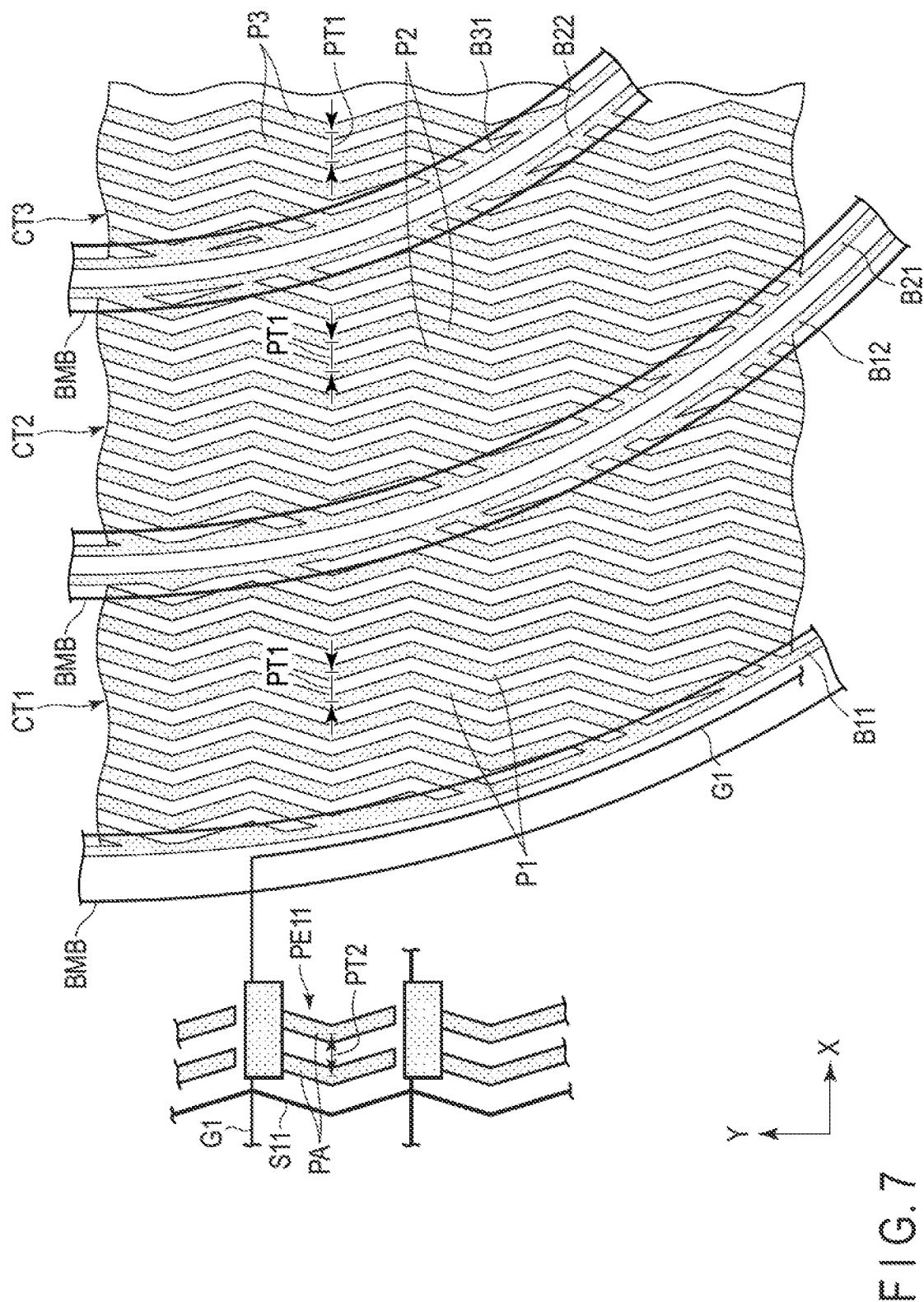
FIG. 7 is a plan view in which the control electrodes CT1 to CT3 shown in FIG. 6 are shown enlarged.

FIG. 7 is a plan view in which the control electrodes CT1 to CT3 shown in FIG. 6 are shown enlarged.

All the strip electrodes P1 to P3 are formed in a wave shape, and extend substantially along the second direction Y. In addition, the strip electrodes P1 to P3 are arranged with an equal pitch PT1 along the first direction X.

On the other hand, the pixel electrode PE11 comprises a plurality of strip electrodes PA. The strip electrodes PA are formed in the same shape as the strip electrodes P1, and are arranged with a pitch PT2 along the first direction X. The pitch PT2 is equal to the pitch PT1. The extension direction of the strip electrodes P1 to P3 and the extension direction of the strip electrode PA each are a direction obliquely intersecting the extension direction of the scanning line G1 (the first direction X). In addition, the extension direction of the strip electrodes P1 to P3 is parallel to the extension direction of the strip electrode PA.

The light-shielding layer BMB shown in FIG. 4 is also disposed in the region A2. In the illustrated example, the light-shielding layer BMB overlaps each of the base electrode B11, the base electrodes B12 and B21 and the base electrodes B22 and B31 and also overlaps a part of the strip electrodes P1 to P3 in planar view.

Figure 8:
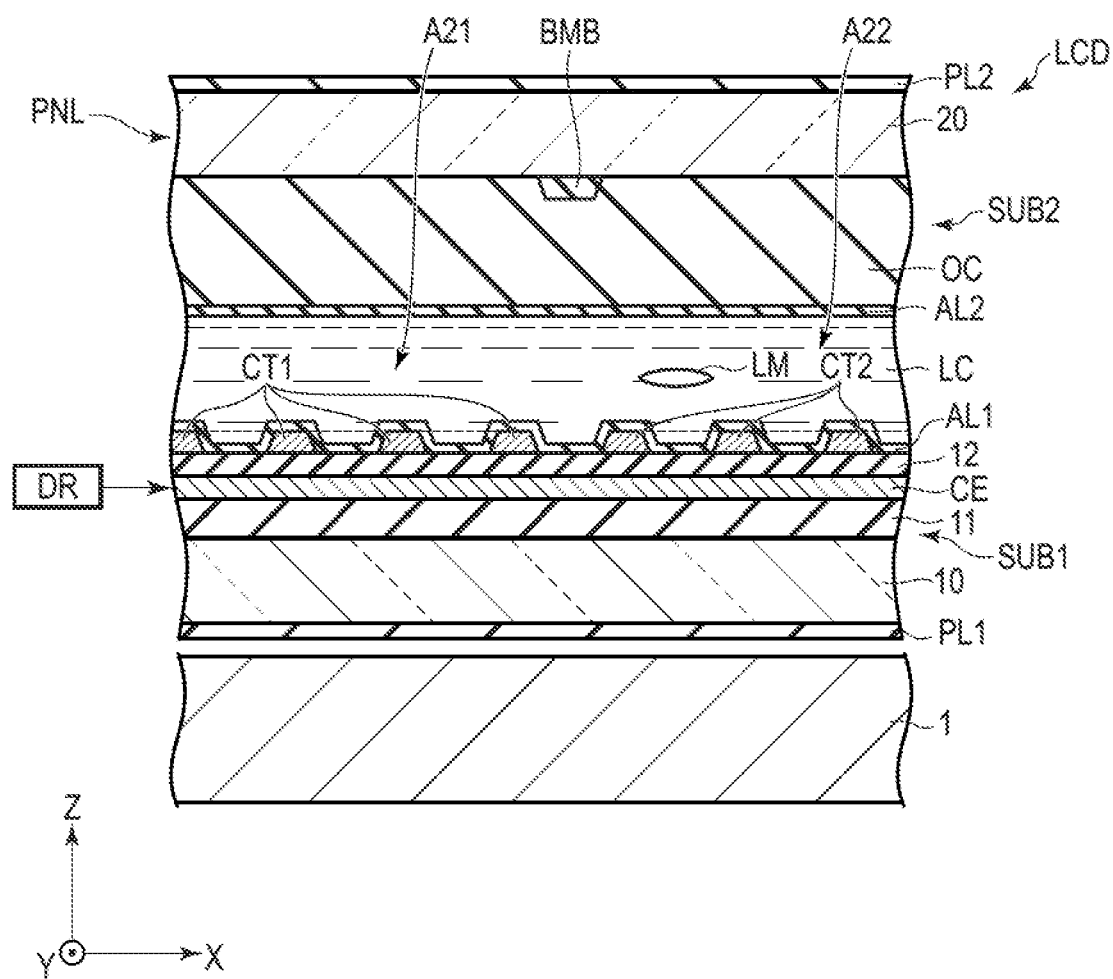
FIG. 8 is a cross-sectional view of the liquid crystal element LCD including regions A21 and A22 shown in FIG. 5.

FIG. 8 is a cross-sectional view of the liquid crystal element LCD including the regions A21 and A22 shown in FIG. 5.

In the first substrate SUB1, the insulating films 11 and 12, the common electrode CE, and the alignment film AL1 extend from the pixel PX shown in FIG. 4 to the regions A21 and A22. That is, the common electrode CE is disposed between the camera 1 and the liquid crystal layer LC, and the insulating film 12 is disposed between the common electrode CE and the liquid crystal layer LC. The control electrode CT1 including the base electrodes B11 and B12 and the strip electrodes P1 shown in FIG. 7 is disposed between the insulating film 12 and the liquid crystal layer LC, and overlaps the common electrode CE. In addition, the control electrode CT2 including the base electrodes B21 and B22 and the strip electrodes P2 is also disposed between the insulating film 12 and the liquid crystal layer LC, and also overlaps the common electrode CE. The control electrodes CT1 and CT2 are disposed in the same layer as the pixel electrode PE shown in FIG. 4, and is formed of a transparent conductive material which is the same material as the pixel electrode PE. The control electrodes CT1 and CT2 are covered with the alignment film AL1. The control electrode CT3, which is not shown in the drawing, is composed in the same manner as the control electrode CT1.

In the second substrate SUB2, the color filter layer is not disposed. That is, the transparent layer OC is in contact with the second insulating substrate 20 directly above the control electrodes CT1 and CT2. The light-shielding layer BMB is disposed between the control electrodes CT1 and CT2, and partly overlaps the control electrodes CT1 and CT2.

The transmittance in the regions A21 and A22 is controlled by the driver DR in the same manner as the pixel PX shown in FIG. 4. That is, in the regions A21 and A22 in the off state where no voltage is applied to the liquid crystal layer LC, in the same manner as the pixel PX, the liquid crystal element LCD has a minimum transmittance and displays black. That is, the liquid crystal element LCD performs a light blocking function in the regions A21 and A22.

On the other hand, in the on state where voltage is applied to the liquid crystal layer LC, the liquid crystal molecules LM of the regions A21 and A22 are aligned in a direction different from the initial alignment direction, and the alignment direction is controlled by an electric field. That is, the alignment direction of the liquid crystal molecules LM of the region A21 is controlled by an electric field formed between the control electrode CT1 and the common electrode CE. In addition, the alignment direction of the liquid crystal molecules LM of the region A22 is controlled by an electric field formed between the control electrode CT2 and the common electrode CE. Similarly, the alignment direction of the liquid crystal molecules LM of the region A23 is controlled by an electric field formed between the control electrode CT3 and the common electrode CE.

In the on state, a part of light guided to the regions A21 and A22 is transmitted through the first polarizer PL1 and the second polarizer PL2. In the regions A21 and A22 in the on state, when the liquid crystal element LCD has a maximum transmittance, the liquid crystal element LCD displays white or turns to a transparent state. In addition, when the liquid crystal element LCD is controlled to an intermediate transmittance between the minimum transmittance and the maximum transmittance, the liquid crystal element LCD may display gray. That is, the liquid crystal element LCD performs a light transmission function in the regions A21 and A22. The transmittance of the region A23, which is not shown in the drawing, is controlled in the same manner as the region A21.

Figure 9:
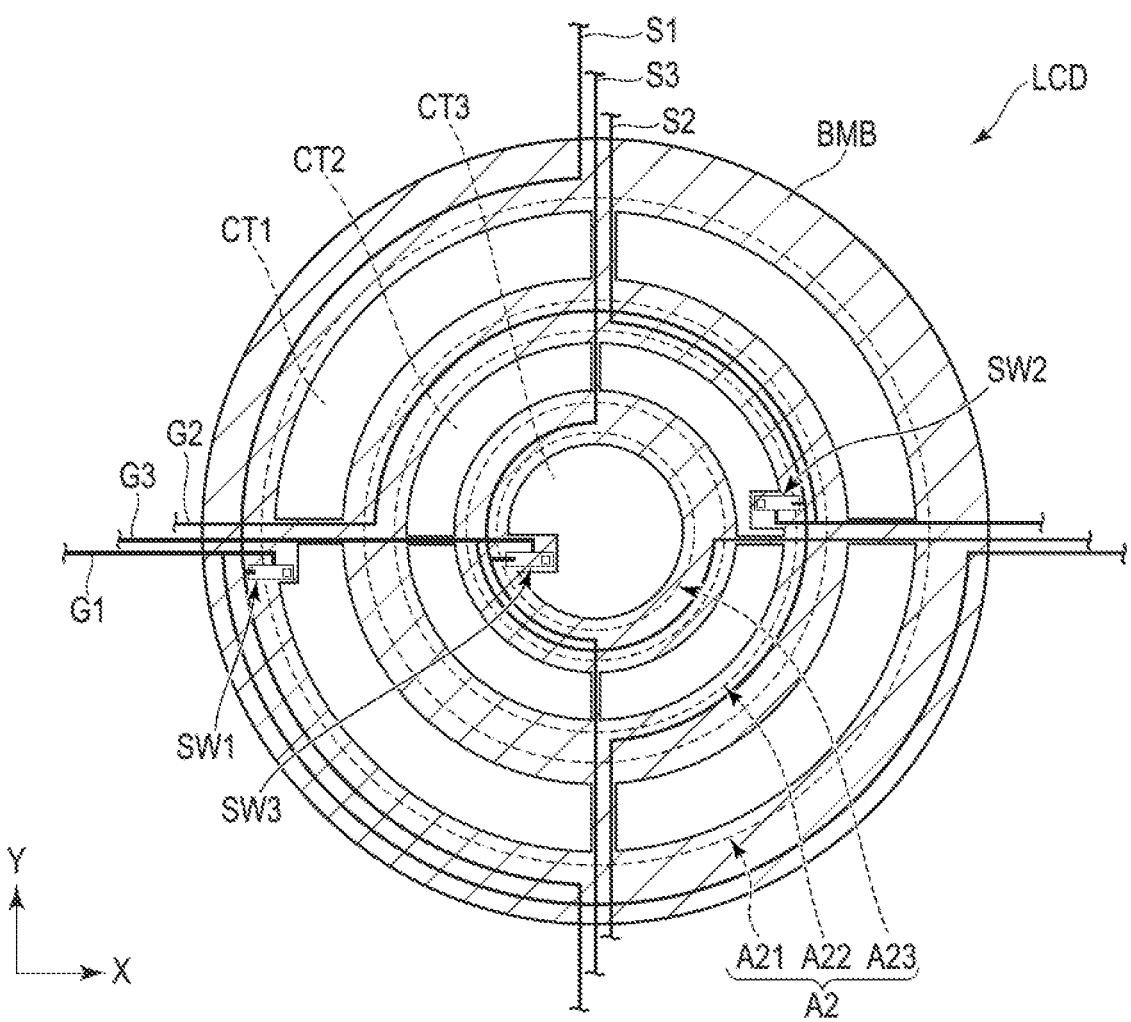
FIG. 9 is a plan view showing a configuration example of a light-shielding layer BMB disposed in a region A2.

FIG. 9 is a plan view showing a configuration example of the light-shielding layer BMB disposed in the region A2. The light-shielding layer BMB is disposed along the outer edge of the region A21. In addition, the light-shielding layer BMB is disposed from the inner edge of the region A21 to the outer edge of the region A22. Furthermore, the light-shielding layer BMB is disposed from the inner edge of the region A22 to the outer edge of the region A23.

The light-shielding layer BMB overlaps the scanning line G1 and the signal line S1 on the outer side of the region A21, and overlaps the scanning lines G2 and G3, the signal lines S2 and S3 and the switching element SW1 in the region A21. The light-shielding layer BMB overlaps the scanning line G3, the signal line S3 and the switching element SW2 in the region A22. The light-shielding layer BMB overlaps the switching element SW3 in the region A23.

The liquid crystal element LCD can function as a shutter for the camera 1 by transmitting light or blocking light for each of the regions A21 to A23. That is, all the regions A21 to A23 are set to the off state in a state where the camera 1 can take in light, at least one of the regions A21 to A23 is switched to the on state for a time required for shooting, and light entering the liquid crystal element LCD is taken into the camera 1 accordingly.

In addition, the liquid crystal element LCD can function as a diaphragm for adjusting the amount of light entering the camera 1 by transmitting light or blocking light for each of the regions A21 to A23. For example, the first diaphragm in which all the regions A21 to A23 are in the on state, the second diaphragm in which the region A21 is in the off state and the regions A22 and A23 are in the on state, and the third diaphragm in which the regions A21 and A22 are in the off state and the region A23 is in the on state can be realized. In the case of the first diaphragm, the amount of the transmitted light or the area of the light transmission region is maximized. In addition, in the case of the third diaphragm, the amount of the transmitted light or the area of the light transmission region is minimized. When all the regions A21 to A23 are in the off state, the amount of the transmitted light is almost zero. As the area of the light transmission region decreases, light rays entering the camera 1 are limited more, and the influence of aberration in the optical system 2 can be reduced, the clarity can be improved, and the depth of focus can be increased. That is, it is possible, by adjusting the area of the light transmission region, to adjust the brightness of the subject, the clarity, the depth of focus and the like. In addition, the amount of light taken into the camera 1 can be adjusted according to the brightness of the surroundings, and a clear image can be captured both in a bright place and in a dark place.

Furthermore, the control electrodes CT1 to CT3 of the region A2 each are composed in the same manner as the pixel electrode PE in the first substrate SUB1. Besides this, the control electrodes CT1 to CT3 each are electrically connected to the signal line via the switching element, and each are controlled by a signal from the IC chip 6 or the display driver in the same manner as when an image signal is written to the pixel electrode PE. Therefore, addition of a new peripheral device is suppressed, and cost reduction, downsizing and weight reduction can be achieved. In addition, the optical property can be changed without using a plurality of cameras, and information with different optical properties can be obtained using the camera 1 alone, and an image can be captured with higher quality.

Furthermore, the extension direction of the strip electrodes P1 to P3 in the control electrodes CT1 to CT3 is parallel to the extension direction of the strip electrode PA in the pixel electrode PE. Therefore, by the first polarizer PL1 and the second polarizer PL2 arranged over both of the regions A1 and A2, the black display and color display of the pixel PX can be switched, and the light blocking and light transmission of the regions A21 to A23 can be switched.

FIG. 10 is a plan view showing another configuration example of the control electrodes CT1 to CT3 shown in FIG. 5 and the common electrode CE.

In the same manner as the example shown in FIG. 6, the control electrode CT1 comprises the base electrodes B11 and B12 and the strip electrodes P1. The control electrode CT2 comprises the base electrodes B21 and B22 and the strip electrodes P2. The control electrode CT3 comprises the base electrode B31 and the strip electrodes P3.

The common electrode CE comprises an annular base electrode B41 and a plurality of strip electrodes P4. The strip electrodes P4 are disposed on the inner side of the base electrode B41, and are formed integrally with the base electrode B41. The shape of the strip electrodes P4 is the same as the shape of the strip electrodes P1. The strip electrodes P1 and P4 are arranged alternately in planar view. Similarly, the strip electrodes P2 and P4 are arranged alternately, and the strip electrodes P3 and P4 are arranged alternately. The pitch of the strip electrodes P1, the pitch of the strip electrodes P2, the pitch of the strip electrodes P3 and the pitch of the strip electrodes P4 are equal.

The strip electrode P4 is located almost in the middle of the adjacent strip electrodes P1 in a region overlapping the control electrode CT1. Similarly, the strip electrode P4 is located almost in the middle of the adjacent strip electrodes P2 in a region overlapping the control electrode CT2. The strip electrode P4 is located almost in the middle of the adjacent strip electrodes P3 in a region overlapping the control electrode CT3.

It should be noted that the common electrode CE illustrated here may be electrically insulated from the common electrode CE of the pixel PX shown in FIG. 4 or may be formed integrally with the common electrode CE of the pixel PX.

Figure 11:
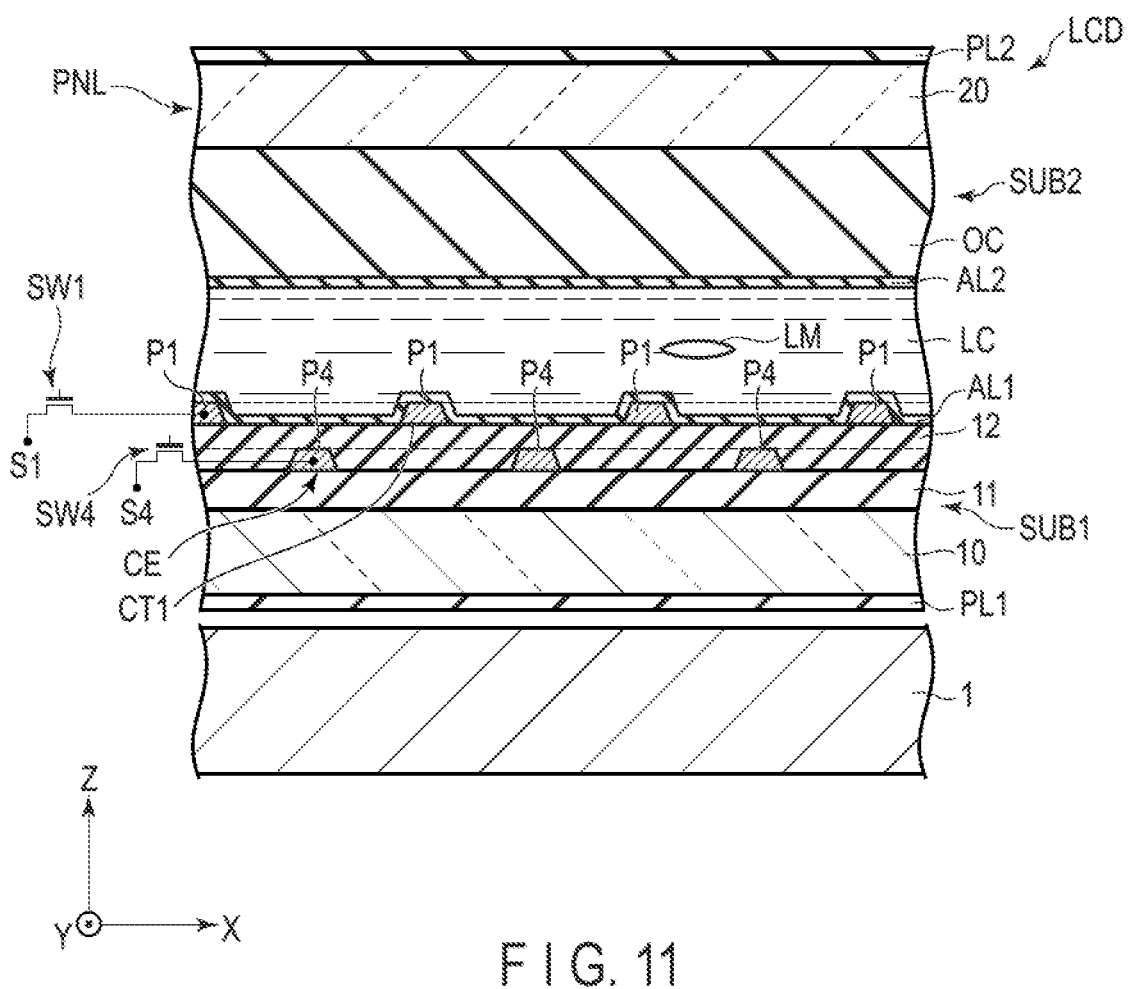
FIG. 11 is a cross-sectional view of the liquid crystal element LCD including the control electrode CT1 and the common electrode CE shown in FIG. 10.

FIG. 11 is a cross-sectional view of the liquid crystal element LCD including the control electrode CT1 and the common electrode CE shown in FIG. 10.

In the first substrate SUB1, the common electrode CE is disposed between the camera 1 and the liquid crystal layer LC, the insulating film 12 is disposed between the common electrode CE and the liquid crystal layer LC, and the control electrode CT1 is disposed between the insulating film 12 and the liquid crystal layer LC. The strip electrode P1 of the control electrode CT1 and the strip electrode P4 of the common electrode CE are arranged alternately along the first direction X.

The control electrode CT1 is electrically connected to the signal line S1 via the switching element SW1 as described with reference to FIG. 5. The common electrode CE is electrically connected to a signal line S4 via a switching element SW4. The signal line S1 and the signal line S4 are not limited to any particular positional relationship, and may be adjacent to each other along the first direction X. For example, the polarity of an image signal supplied from the signal line S1 is opposite to the polarity of an image signal supplied from the signal line S4. In the illustrated configuration example, the polarity of voltage supplied from the signal line S1 to the control electrode CT1 is opposite to the polarity of voltage supplied from the signal line S4 to the common electrode CE. Accordingly, a larger potential difference can be formed between the control electrode CT1 and the common electrode CE.

According to this configuration example, the same effects as those of the above configuration example can be obtained. In addition, also when the pitch of the strip electrodes P1 and P4 is larger than the pitch PT2 of the strip electrode PA described with reference to FIG. 7, an electric field sufficiently large to control the alignment direction of the liquid crystal molecules LM can be formed. In other words, the distance between the adjacent strip electrodes in the region A2 can be made larger than the distance between the adjacent strip electrodes in the pixel PX. Accordingly, diffraction of light in the region A2 overlapping the camera 1 can be suppressed, and an image can be captured with higher quality.

Next, another embodiment will be described.

Figure 12A:
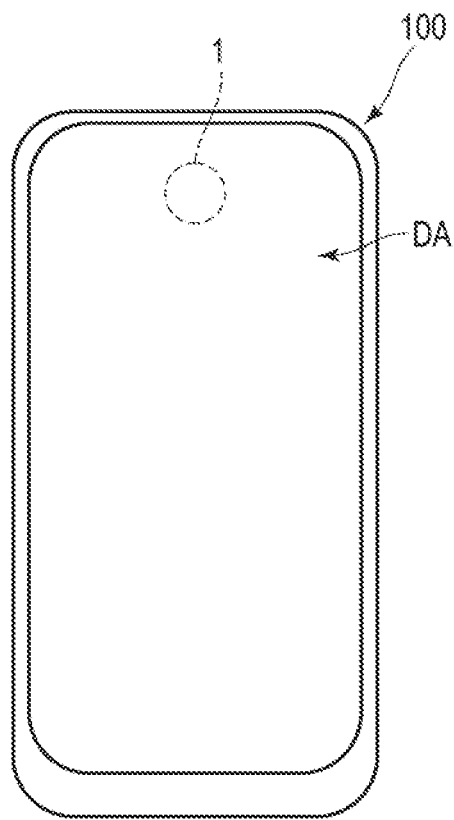
FIG. 12A is a plan view showing an electronic device 100 according to another embodiment.
Figure 12B:
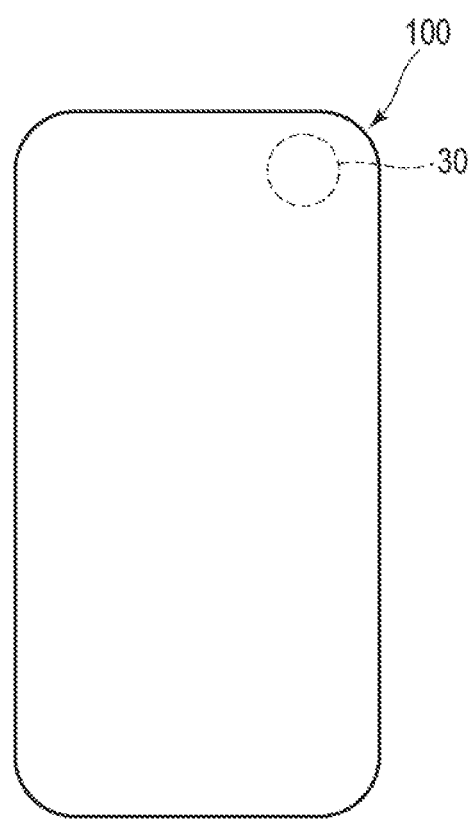
FIG. 12B is a plan view showing the electronic device 100 according to the other embodiment.

FIGS. 12A and 12B each are a plan view showing the electronic device 100 according to another embodiment. FIG. 12A is a plan view showing the front side of the electronic device 100. In the same manner as the configuration example shown in FIG. 3, the camera 1 overlaps the display portion DA. The camera 1 shoots the front side of the electronic device 100. FIG. 12B is a plan view showing the rear side of the electronic device 100. A camera 30 different from the camera 1 on the front side is disposed on the rear side. The camera 30 shoots the rear side of the electronic device 100. In some cases, a plurality of cameras 30 may be disposed on the rear side.

Figure 13:
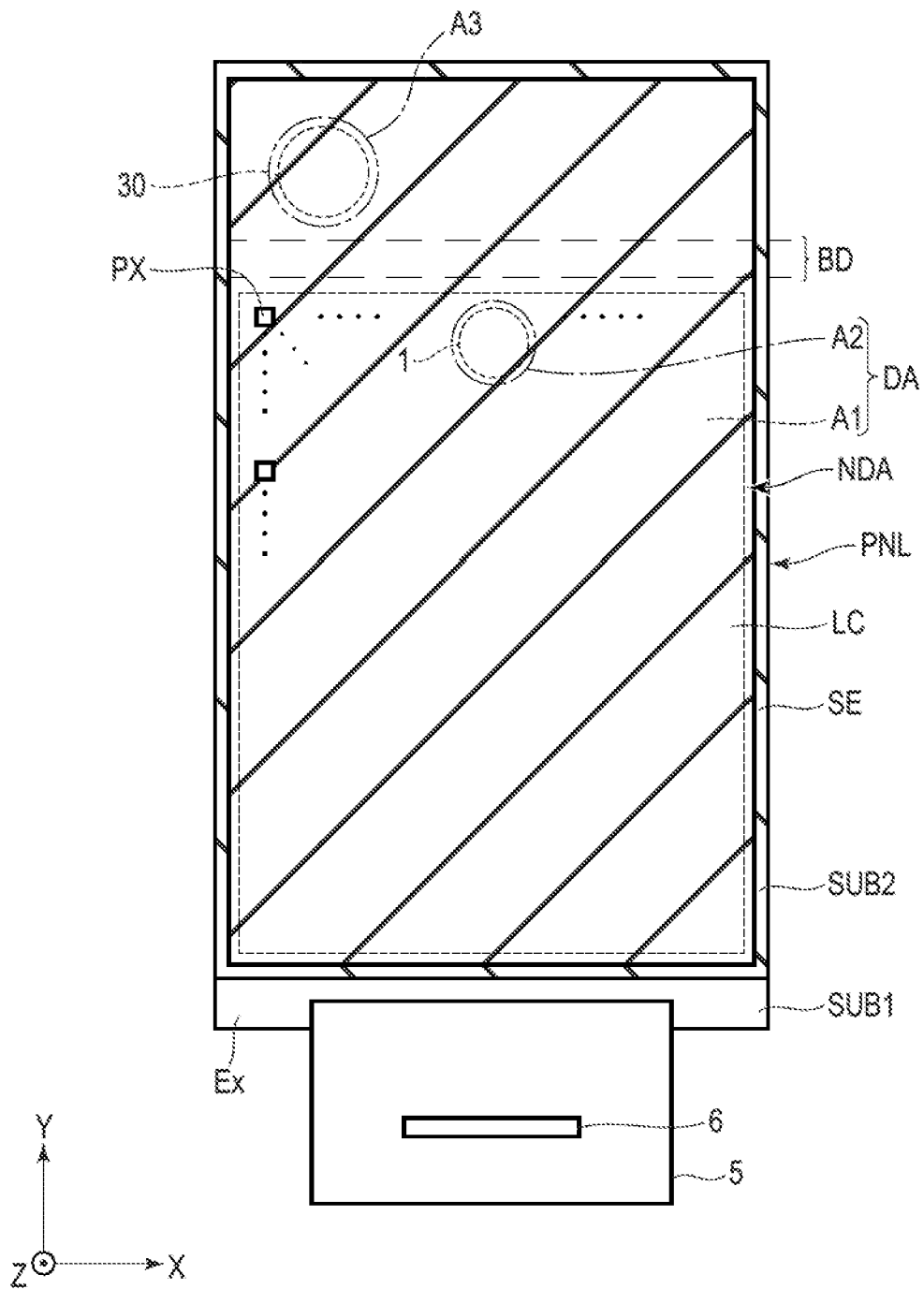
FIG. 13 is a plan view showing a configuration example of the liquid crystal panel PNL applied to the electronic device 100 shown in FIGS. 12A and 12B.

FIG. 13 is a plan view showing a configuration example of the liquid crystal panel PNL applied to the electronic device 100 shown in FIGS. 12A and 12B. The liquid crystal panel PNL is a bendable flexible display, but an unbent state thereof is shown in the plan view of FIG. 13. The liquid crystal panel PNL has a bend portion BD. The liquid crystal panel PNL has a region A3 which overlaps the camera 30 when the liquid crystal panel PNL is bent. The region A3 is composed in the same manner as the region A2, and includes the liquid crystal layer LC. That is, the bend portion BD is located between the region A2 and the region A3. The liquid crystal panel PNL is bent between the region A2 and the region A3.

Figure 14:
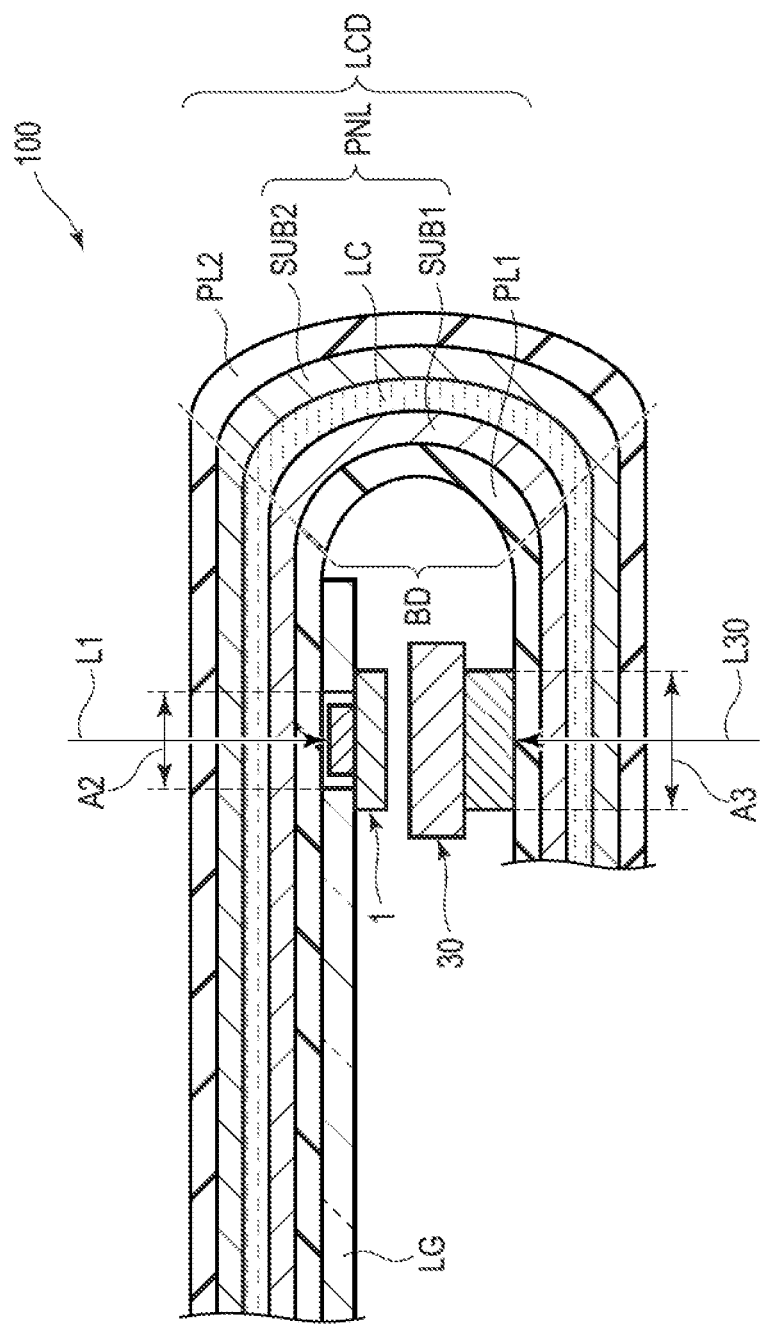
FIG. 14 is a cross-sectional view showing a bent state of the liquid crystal panel PNL shown in FIG. 13.

FIG. 14 is a cross-sectional view showing a bent state of the liquid crystal panel PNL shown in FIG. 13. Although the illustrations of the optical sheets and reflective sheet are omitted here, the optical sheets and the reflective sheet are not disposed closer to the camera 30 than the bend portion BD. The liquid crystal panel PNL is bent between the region A2 and the region A3. The first polarizer PL1 and the second polarizer PL2 are also bent in the same manner as the liquid crystal panel PNL. The camera 1 and the camera 30 are disposed on the inner side of the bent first polarizer PL1. The camera 1 overlaps the region A2, and the camera 30 overlaps the region A3. In addition, the camera 1 and the camera 30 each overlap the first polarizer PL1 and the second polarizer PL2, and the liquid crystal panel PNL. The traveling direction of light L1 received by the camera 1 is opposite to the traveling direction of light L30 received by the camera 30.

FIG. 15 is a plan view showing a configuration example of the liquid crystal element LCD overlapping the camera 30. The liquid crystal element LCD has three regions A31 to A33 as the region A3 overlapping the camera 30. The regions A31 and A32 each are formed in an annular shape. The region A33 is formed in an almost circular shape. The region A32 is adjacent to the inner side of the region A31, and the region A33 is adjacent to the inner side of the region A32. It should be noted that the region A3 may be divided into four or more regions or may be divided into two regions. The regions A31 to A33 are composed in the same manner as the regions A21 to A23 shown in FIG. 5. Each region will be briefly described below.

A switching element SW31 is electrically connected to a scanning line G31 and a signal line S31. A control electrode CT31 is disposed in the region A31, and is electrically connected to the switching element SW31. A switching element SW32 is electrically connected to a scanning line G32 and a signal line S32. A control electrode CT32 is disposed in the region A32, and is electrically connected to the switching element SW32. A switching element SW33 is electrically connected to a scanning line G33 and a signal line S33. A control electrode CT33 is disposed in the region A33, and is electrically connected to the switching element SW33. The control electrodes CT31 to CT33 are composed in the same manner as, for example, FIG. 6.

According to this other embodiment, the same effects as those of the above embodiment can be obtained. In addition, the liquid crystal element LCD can realize the shutter function or the diaphragm function of both of the cameras 1 and 30. Accordingly, as compared with an electric device comprising a mechanical shutter mechanism or a mechanical diaphragm mechanism, the thickness can be reduced and the weight can be reduced.

As described above, according to the present embodiment, an electric device capable of expanding a display portion can be provided. In addition, an electric device capable of taking a clear picture can be provided.

In the present embodiment, for example, the camera 1 corresponds to the first camera, the polarizer PL1 corresponds to the first polarizer, the polarizer PL2 corresponds to the second polarizer, the scanning line G1 corresponds to the first scanning line, the signal line S1 corresponds to the first signal line, the switching element SW1 corresponds to the first switching element, the control electrode CT1 corresponds to the first control electrode, the region A21 corresponds to the first region, the base electrode B11 corresponds to the first base electrode, the strip electrode P1 corresponds to the first strip electrode, the strip electrode P4 corresponds to the second strip electrode, and the strip electrode PA corresponds to the third strip electrode.

In addition, the camera 30 corresponds to the second camera, the scanning line G31 corresponds to the second scanning line, the signal line S31 corresponds to the second signal line, the switching element SW31 corresponds to the second switching element, the control electrode CT31 corresponds to the second control electrode, and the region A31 corresponds to the second region.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a first camera;
a first polarizer;
a second polarizer; and
a liquid crystal panel disposed between the first polarizer and the second polarizer, wherein
the liquid crystal panel comprises:
a first switching element electrically connected to a first scanning line and a first signal line;
a second switching element electrically connected to a second scanning line and a second signal line;

a liquid crystal layer; and
a common electrode,
a first control electrode is electrically connected to the first switching element,
the first control electrode overlaps the first camera, and is disposed in an annular first region,
the first control electrode comprises an annular first base electrode, and a plurality of first strip electrodes,
the first strip electrodes are connected to the first base electrode,
a second control electrode is electrically connected to the second switching element,
the second control electrode overlaps the first camera, and is disposed in an annular second region,
the second control electrode comprises an annular second base electrode, and a plurality of second strip electrodes, and
the second strip electrodes are connected to the second base electrode.

2. The electronic device of claim 1, wherein the annular second region is located on the inner side of the annular first region.

3. The electronic device of claim 1, wherein the first scanning line and the first signal line are formed in an arc shape along the annular first region.

4. The electronic device of claim 1, wherein a light shielding layer overlaps the annular first region and the annular second region.

* * * * *